(12) United States Patent
Adank et al.

(10) Patent No.: US 11,977,635 B2
(45) Date of Patent: May 7, 2024

(54) PROTECTION OF COMPUTER SYSTEMS AGAINST MANIPULATION AND FUNCTIONAL ANOMALIES

(71) Applicant: Basler Aktiengesellschaft, Ahrensburg (DE)

(72) Inventors: Sebastian Adank, Ahrensburg (DE); Timm Von Der Mehden, Ahrensburg (DE); Jens Dekarz, Bad Oldesloe (DE)

(73) Assignee: Basler Aktiengesellschaft, Ahrensburg (DE)

( * ) Notice: Subject to any disclaimer, the term of this patent is extended or adjusted under 35 U.S.C. 154(b) by 140 days.

(21) Appl. No.: 17/326,769

(22) Filed: May 21, 2021

(65) Prior Publication Data
US 2021/0374245 A1 Dec. 2, 2021

(30) Foreign Application Priority Data
May 27, 2020 (DE) ...................... 10 2020 114 199.8

(51) Int. Cl.
*G06F 21/56* (2013.01)
*G06F 8/65* (2018.01)
(Continued)

(52) U.S. Cl.
CPC .............. *G06F 21/568* (2013.01); *G06F 8/65* (2013.01); *G06F 21/552* (2013.01);
(Continued)

(58) Field of Classification Search
CPC ........ G06F 21/568; G06F 8/65; G06F 21/552; G06F 21/554; G06F 21/57; G06F 21/71; G06F 21/55; H04L 9/0825; H04L 63/0435; H04L 63/061; H04L 2463/062; H04L 9/3239; H04L 63/123; H04L 63/1425; H04L 63/1441
See application file for complete search history.

(56) References Cited

U.S. PATENT DOCUMENTS

| 7,360,253 B2 | 4/2008 | Frank et al. |
| 9,942,034 B2 | 4/2018 | Le Saint et al. |

(Continued)

FOREIGN PATENT DOCUMENTS

WO 0192981 A2 12/2001

*Primary Examiner* — J. Brant Murphy
(74) *Attorney, Agent, or Firm* — Quarles & Brady LLP

(57) ABSTRACT

A system is provided for protecting a computer system and/or control system against manipulation and functional anomalies. The system includes a monitoring module, which has at least a first interface, a second interface, and at least one memory. The system is configured to receive information characterizing the system state of the computer system and/or control system via the first interface, receive an encrypted request for system state via the second interface and decrypt it using a request key stored in the memory, and generate a response to the request from at least a portion of the information received via the first interface.

Figure 1:
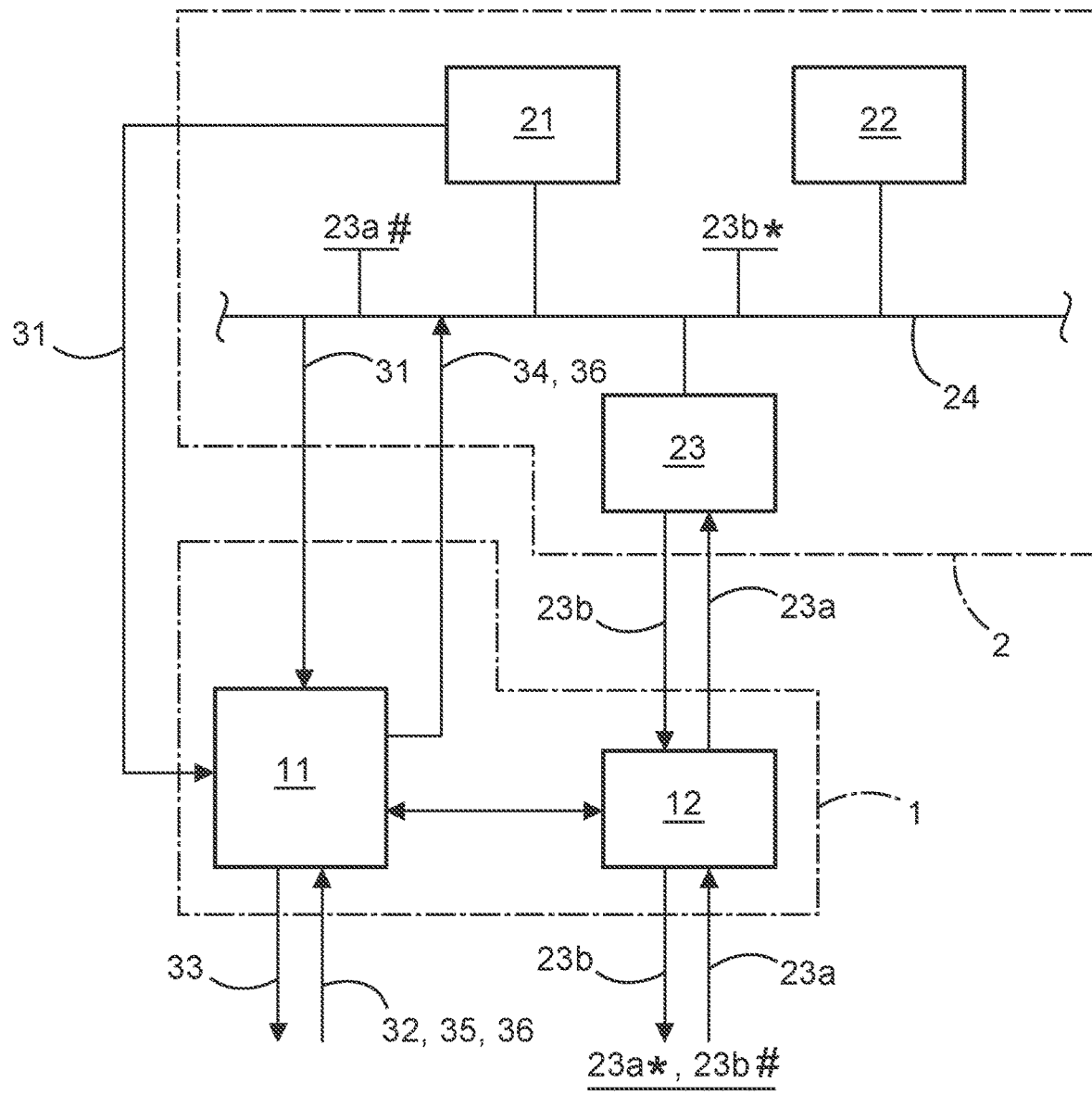

The system is also configured to encrypt the response with a response key
 determined using the request and output it via the second interface,
 determine a new request key which is a shared secret also accessible to the sender of the request, and store this new request key in the memory.

25 Claims, 2 Drawing Sheets

(51) Int. Cl.
*G06F 21/55* (2013.01)
*H04L 9/08* (2006.01)
*H04L 9/40* (2022.01)

(52) U.S. Cl.
CPC .......... *G06F 21/554* (2013.01); *H04L 9/0825* (2013.01); *H04L 63/0435* (2013.01); *H04L 63/061* (2013.01)

(56) References Cited

U.S. PATENT DOCUMENTS

| | | |
|---|---|---|
| 10,412,191 B1* | 9/2019 | Brandwine ............ G06F 9/5077 |
| 2002/0078345 A1* | 6/2002 | Sandhu .................. H04L 9/085 |
| | | 713/155 |
| 2005/0091494 A1 | 4/2005 | Hyser |
| 2006/0075264 A1 | 4/2006 | Willman et al. |
| 2009/0327737 A1* | 12/2009 | Hsu ....................... H04L 9/3247 |
| | | 713/181 |
| 2010/0061272 A1* | 3/2010 | Veillette .............. H04W 40/005 |
| | | 370/254 |
| 2016/0125188 A1* | 5/2016 | Hall ...................... H04L 9/0825 |
| | | 713/164 |
| 2017/0068804 A1 | 3/2017 | Wichmann et al. |
| 2018/0176013 A1* | 6/2018 | Cheng ..................... G06F 21/64 |
| 2019/0058600 A1* | 2/2019 | Wright .................. H04W 12/03 |
| 2019/0109822 A1* | 4/2019 | Clark ..................... H04L 63/145 |
| 2019/0268376 A1* | 8/2019 | Park ...................... H04L 9/0819 |
| 2020/0053061 A1* | 2/2020 | Cambou ............. H04L 63/0457 |
| 2020/0153628 A1* | 5/2020 | Sakai ........................ H04L 9/16 |
| 2020/0313902 A1* | 10/2020 | Yu .......................... G06F 21/71 |
| 2020/0328882 A1* | 10/2020 | Hoshizuki ............. H04L 9/0643 |
| 2022/0092224 A1* | 3/2022 | Yamada ................. G06F 21/86 |

* cited by examiner

PROTECTION OF COMPUTER SYSTEMS AGAINST MANIPULATION AND FUNCTIONAL ANOMALIES

CROSS REFERENCE

This application claims the benefit of German Application No. 10 2020 114 199.8 filed on May 27, 2020, which is herein incorporated by reference in it entirety.

FIELD OF THE INVENTION

The invention relates to securing computer systems, particularly in IoT devices, against tampering and, more generally, against functional anomalies regardless of their cause.

BACKGROUND

The utility of devices for the Internet of Things (IoT) is largely determined by their networking via one or more interfaces. However, this networking creates attack surfaces. As soon as data received via interfaces is processed by software on the device, there is a risk that an attacker will impose his will on the software on the device with specially prepared data that deliberately does not comply with the specification for data exchange, and thus take control of the device.

For example, if the software on the device expects a certain amount of data to be delivered according to the specification and reserves space in the main memory for this amount of data, then an attacker can simply send more data than intended. If this is not explicitly intercepted in the software, the data is written beyond the limit of the actually reserved area (buffer overflow). In this way, the attacker can possibly overwrite memory addresses relevant for the control flow of the software and also immediately deliver code that is to be executed next instead of the originally planned activity of the software.

In addition, there are plenty of other ways to use manipulated data to create situations that were not foreseen when the software's control flow was designed. Each of these situations has the potential to escalate to the point where code supplied by the attacker is eventually executed, or at least the software crashes and stops working. Even if the programmer of the software makes special efforts to anticipate such manipulations, it is only a matter of time before an attacker creates a completely new situation not yet handled in the design of the control flow.

Objective and Solution

It is therefore the objective of the invention to at least detect manipulations and functional anomalies in computer systems and/or control systems even in the case that their software is completely under the control of an attacker, so that appropriate countermeasures can be initiated.

This objective is solved according to the invention by a system according to the main claim. Further advantageous embodiments result from the subclaims referring back thereto.

Disclosure of the Invention

In the context of the invention, a system for securing a computer system and/or control system against manipulation and functional anomalies has been developed.

In this context, manipulation means, in particular, any deliberately induced intervention in the computer system and/or control system with the aim of disrupting or changing a system state and/or an intended functionality of the computer system and/or control system. In particular, such manipulation may include, for example, interfering with the control flow of the software of the computer system and/or control system, such that this software subsequently does something different than originally intended. For example, the computer system and/or control system may be converted to mine cryptocurrencies at no cost to the attacker, to send unsolicited emails ("spam"), or to send useless data packets as part of a distributed denial of service (DDoS) attack. However, the attack can also cause the computer system and/or control system to disclose sensitive data (such as access data to other systems) or to adapt its primary function to the will of the attacker. For example, a surveillance camera may stop updating its image at certain times without comment so that the attacker can gain access without being detected.

The term functional anomaly, on the other hand, is not limited to such anomalies that have been deliberately brought about by humans. Rather, this term also includes, for example, situations in which the hardware of the computer system and/or control system, and/or a peripheral connected thereto (such as a sensor), is defective or inoperable for other reasons (such as wear and tear or contamination).

The system comprises a monitoring module having at least a first interface, a second interface and at least one memory, said memory preferably being independent of the memory of the computer system and/or control system. The first interface is preferably a physical interface that can directly access the memory of the computer system and/or control system in hardware. The monitoring module receives information characterizing the system state of the computer system and/or control system via the first interface, and based on this information responds to a system state request received via the second interface. This communication via the second interface proceeds in an encrypted manner. On the one hand, this encryption prevents unauthorized reading of the information during transmission via the second interface and via a network to which this second interface may be connected. On the other hand, the key management of this encryption ensures that

- only an authorised communication partner can enquire about the system status of the computer system and/or control system, which may include sensitive information, and
- a potentially compromised computer system and/or control system software cannot spoof the response of the monitoring module even if that software is capable of sending data to the same network to which the second interface of the monitoring module is connected.

For this purpose, the monitoring module decrypts an encrypted request received via the second interface using a request key stored in the memory. This only provides a meaningful result if the sender of the request has used the correct request key, i.e. is in possession of this request key as an authorized communication partner.

The monitoring module generates a response to the request from at least part of the information received via the first interface. This information, and in particular for example its level of detail, may be controlled for example by the content of the request. For example, a first request may request summary information as to whether the computer system and/or control system is functioning properly as a whole, and/or in certain partial aspects. If it becomes apparent that not everything is in order, further requests may be made for more details, such as log files of certain services running on the computer system and/or control system, or even memory images of certain running processes.

Restricting requests to senders in possession of the valid request key is particularly important with respect to the latter detailed requests. For example, a memory image of a server process open to the Internet that supports TLS encryption may contain the private key that this server process uses to identify itself when establishing a connection. Whoever captures this private key can set up a forgery of the server process without requesting clients reporting a certificate error.

The response is encrypted with a response key determined using the request and output via the second interface. A new request key is determined, which is a shared secret that is also accessible to the sender of the request (32). This new request key is stored in the memory.

It is understood that the new request key is a "shared secret" that is also accessible to the sender of the request, in particular that the new request key is formed from information that is accessible to both the monitoring module and the sender of the request and optionally also to other authorized senders of requests, but not to any unauthorized third party.

For example, the new request key may be determined using a response provided to a previous request. Since this response depends on the system state of the computer system and/or control system, which should not change during normal operation, additional unpredictable information may be introduced into the formation of the request key. This may be, for example, a value from a random number generator.

The value may also result, for example, from changing system states, such as a hash over the stack, IO information, or information about interfaces of the computer system and/or control system.

Particularly advantageously, the unpredictable additional information is information that the sender of the request can also obtain on its own, but which is nevertheless not accessible to any unauthorized third party. Then neither this additional information nor the new request key has to be transmitted from the monitoring module to the sender of the request. This simplifies the administration of the request keys, especially in a constellation in which requests from several senders are to be answered alternately. New request keys do not have to be actively distributed to all potential requesters.

If, on the other hand, the unpredictable additional information is not available at the sender of the request (or at the further authorized potential sender of future requests), the new request key can, for example, be encrypted with the response key and transmitted together with the response, i.e., for example, packed into this response.

Alternatively or in combination to this, the new request key can be determined by using the request, for example. Then the sender of the request takes the more active part in the administration of the request keys.

For example, the sender of the request may generate a response key on its side in any manner (such as with a random number generator) and send it encrypted to the monitoring module as part of the request. However, the sender may also send, for example, any other information to the monitoring module that allows the monitoring module to compute a response key also present on the sender's side. Regardless of which path is chosen in detail, after the successful decryption of the request by the monitoring module, both this monitoring module and the sender of the request have the response key as a shared secret.

In a completely analogous fashion, the new request key also becomes a shared secret known only to the request sender and the monitoring module.

The software running outside the monitoring module on the computer system and/or control system does not have access to the request key or to the response key. Therefore, it cannot generate fake responses from the monitoring module that are considered valid by the request sender. Changing the response key also has the effect that old, genuine responses from the monitoring module, which were recorded during transmission via the second interface or via a network connected to it, cannot be reused later. Thus, corrupted computer system and/or control system software cannot disguise the true system state by deliberately suppressing the transmission of the monitoring module's genuine response over the network and instead sending the sender of the request the previously recorded old response.

The encryption of the communication between the sender of the request and the monitoring module can in particular be, for example, a symmetric encryption. The encryption then requires considerably fewer hardware resources than an asymmetric encryption would require. The monitoring module is ideally configured as a separate hardware module with its own processor and memory, to which the software otherwise running on the computer system and/or control system has no access. Computing capacity in such a hardware module is significantly more expensive than "normal" computing capacity in the computer system and/or control system.

In a particularly advantageous embodiment, the monitoring module is additionally configured to form a new request key using the response key and to store it in the memory. In particular, for example, the response key can be used as a request key for the next request. The same key is then still valid exactly once for encrypting a request to the monitoring module and exactly once for encrypting a response from the monitoring module. It is therefore not possible to reuse old messages in either direction of communication (replay).

In another particularly advantageous embodiment, a key included in the request is additionally authenticated before being used to form the response key. For this purpose, a compressed digest of a key contained in the request is compared with a comparison compressed digest previously stored in the memory of the monitoring module.

A compressed digest is understood to be any condensed form of data that does not allow any inference to the original data. In particular, the compressed digest can be cryptographically secure in that it is not possible with reasonable effort to find data for a given compressed digest that is mapped to exactly this compressed data. An example of such a cryptographically secure compressed digest is a hash value.

In particular, the comparison compressed digest may have been delivered with the sender's previous request. This means that with each request, the sender of the request can announce in advance which response key it will send with the next request, without this response key having to already be stored in the monitoring module by the time this next request actually comes. This makes it even more difficult for a new, unauthorized requester to "latch on" to the communication with the monitoring module.

If the compressed digest delivered with the current request matches the comparison compressed digest currently stored in the memory of the monitoring module, the sender of the request has "kept its word" and transmitted exactly the key that it previously announced. This key is then used to form the response key, for example, by immediately using it as the response key. Furthermore, a new compressed digest contained in the request, which is used to announce the key transmitted in the next request, is stored in the memory of the monitoring module as a new comparison compressed digest.

Furthermore, the monitoring module can additionally determine a new request key for the next request using the new compressed digest and store it in the memory. In particular, for example, the new compressed digest itself can be used as a new request key and then only needs to be stored once in the memory of the monitoring module. Thus, the sender of requests only needs to generate a single new key per request, which it announces as the response key for the next request, and the compressed digest of this new key then also immediately secures the transmission of the next request. This provides a speed advantage, because the generation of new, unpredictable keys is time-consuming, depending on the quality of a pseudorandom number generator used to generate random numbers and on the complexity of the downstream algorithm used to further process these random numbers into a key. This is particularly true if a large number of computer systems and/or control systems are monitored from a central location and new keys have to be generated repeatedly for each request in each of these communication relationships.

The information characterizing the state of the computer system and/or control system, and on the basis of which the monitoring module generates the response to the request, may in particular include, for example, information that does not change or changes only in a predictable manner during normal operation of the computer system and/or control system. From changes in this information that are no longer within the scope of what is expected, it can then be concluded that the computer system and/or control system is in an abnormal or even manipulated state.

An example of this is program code executable by at least one processor of the computer system and/or control system. The software of the computer system and/or control system should not change during normal operation unless an update or patch is being applied. Changes to the software that cannot be explained by this are very likely to have been introduced maliciously. The software can be examined on the mass storage device (such as hard disk, SSD, flash memory or SD card) from which the computer system and/or control system loads it at boot time. However, the software may also be examined, for example, in the random access memory (RAM) of the computer system and/or control system. The latter makes it possible, in particular, to detect manipulations in which malicious code has been injected into the RAM and the control flow of the software has been bent to this malicious code.

The latter manipulations can alternatively or in combination also be detected by examining the size and/or content of nominally unused memory areas of the control system and/or computer system. In many cases, malicious code is loaded into such areas (for example, by "heap spraying") and then attempts to change one or more pointers in the control flow of the software (for example, return addresses on a stack) so that they point into the memory area occupied by the malicious code. Furthermore, the examination of nominally unused memory areas can in particular also detect attempts to exploit "use after free" flaws, in which the software reports a memory area free but then still accesses it incorrectly.

IoT devices and other systems in particular are often operated for a long time in a steady state in which a constant constellation of applications is running and the content of at least large parts of the working memory should not change. In extreme cases, the contents of the main memory should not change at all, with the exception of those areas in which the currently running applications store their current inputs and the processing results of these inputs. In the case of any changes to the memory contents that cannot be explained by the running operation, the suspicion is obvious that an attacker has converted one of the applications for his own purposes.

The monitoring of the working memory is particularly advantageous in connection with a monitoring module whose first interface can directly access this working memory in terms of hardware. The working memory can then be read out past the software running on the computer system and/or control system. This software is therefore unaware of the monitoring. Thus, malicious software cannot take any countermeasures to make its detection more difficult, such as always pretending to be in the original state at the point where the memory contents are currently being checked. Furthermore, such a minimal interface makes it difficult to attack the monitoring module and the software implemented on it. The monitoring module only needs to compare the memory content with an original state, which can be done, for example, by matching a hash value over this memory content with a reference. A deeper interpretation of this data, which favors an attack by deliberately presenting invalidly formatted or otherwise unexpected data, is not required.

For example, the computer system and/or control system software may also include configuration data for at least one field programmable gate array, FPGAs, or at least one other programmable logic device of the computer system and/or control system. For example, as part of the initialization of the software, it may be provided that this configuration data is loaded onto the corresponding logic device and the logic device is then caused to operate in accordance with this configuration data.

Another example are fixed parameters and/or parameters that can only be changed externally, which influence the work of the computer system and/or control system. These parameters should also not change during normal operation. A change from the outside can, for example, be triggered via the monitoring module, for example with a request with which the system status is also queried. The monitoring module can pass on the changes to the computer system and/or control system and then return the system state that has been changed in such an authorized manner. This system state can then be stored as a reference by the sender of the request for further monitoring. Subsequent changes may be measured against this reference. Alternatively, the parameters may be changed via any interface of the computer system and/or control system, and the system state supplied in response to the next request, again changed in an authorized manner, may then be stored as a reference for further monitoring.

In a further advantageous embodiment, the monitoring module is additionally configured to determine, according to a predetermined metric, a measure of a change in information used to form the response within a predetermined time period. Then, the monitoring module may already process the information provided to the request sender such that changes for which there is a plausible explanation are not considered suspicious. For example, it is common for computer systems that accept requests from the Internet to experience diurnal fluctuations in the load of requests. These fluctuations are not indicative of an attack. A sudden jump to a then sustained full CPU load, on the other hand, may indicate that the CPU is being used to mine cryptocurrency. For example, a sudden jump in input-output utilization to sustained full utilization may indicate that an attempt is being made to encrypt the data files. Accordingly, the monitoring module may also be adapted to initiate at least one countermeasure against an attack on the computer system and/or control system, and/or against a malfunction of the computer system and/or control system, in response to the detected change meeting a predetermined criterion.

However, the monitoring module is not left to itself to decide on countermeasures. In a further advantageous embodiment, the monitoring module is additionally adapted to initiate at least one countermeasure against an attack on the computer system and/or control system, and/or against a malfunction of the computer system and/or control system, in response to having received via the second interface a control command encrypted with the request key stored in the memory. The monitoring module then has direct access to the computer system and/or control system to perform the action. On the other hand, the sender of the request, i.e. the communication partner of the monitoring module, makes the decision to initiate action. The sender can, for example, compare the information about the system status that it received with the response from the monitoring module with any other information sources in order to check whether the information indicates an attack.

If the monitoring module no longer responds to requests, this may indicate that it has been hijacked by an attacker or rendered inoperable. It can then be assumed that the attacker knows the previously used request keys and response keys. This may also prompt one or more countermeasures, up to and including disconnecting the computer system and/or control system from the network or power supply, to prevent further damage from being done. For example, systems cooperating with the affected system may also be notified to cease such cooperation. This can, for example, make it more difficult to gradually infiltrate an entire network or even spread malicious code from one system to another in a worm-like manner.

As a countermeasure, for example, an alarm may be issued, prompting a technician to investigate the cause of the observed abnormal condition or behavior. Provided the monitoring module is still accessible and not hijacked, the computer system or control system may be caused to output operational data, log data and/or diagnostic information. A self-test of the computer system or control system may also be initiated.

The computer system or control system can be switched off, restarted or reset to factory settings. A software update and/or patch may be applied to the computer system or control system. Here, a software update may comprise, for example, an updated version of the software that, inter alia, fixes certain known bugs, whereas a patch is not intended to add any new functionality to the software, but is intended to fix bugs only.

It may also reduce the value of the computer system and/or control system in a decentralized peer-to-peer network. In this way, at least some basic functionality of the computer system and/or control system may continue to be utilized while minimizing harmful effects within the peer-to-peer network. The computer system and/or control system may also be placed in an emergency mode.

To mitigate damage, the computer system or control system may also be caused to protect important data from loss by sending it over a communications interface and/or to protect confidential data from disclosure by deleting it.

A logistical action may also be initiated, such as a service call and/or equipment replacement at the location of the computer system and/or control system.

The monitoring module may be further adapted to cause the update to be applied to the computer system or control system in response to having received, via the second interface, an update encrypted with the request key stored in the memory. In this way, it can be ensured that updates are obtained only from a trusted source identified by possession of the current request key.

When the monitoring module reports the system state to the request originator, it may do so in any form. As mentioned before, the information characterizing the system state can be delivered in different levels of detail up to memory images. For summary monitoring of whether anything has changed at all, information at a much lower volume is sufficient. IoT devices in particular are often connected via mobile radio or via radio frequencies with limited transmission time (duty cycle), so that only a limited volume of data can be transmitted within a given time unit. If routine monitoring can be reduced to a small data volume, more data volume can be used for detailed investigation of suspicious conditions or activities.

Therefore, in a further advantageous embodiment, the response generated by the monitoring module includes.
  a hash value of information used to form the response, and/or
  a measure of a change in that information within a specified time period, determined according to a specified metric.

In a further particularly advantageous embodiment, the system further comprises at least one security module via which communication is routed to and from at least one interface of the computer system and/or control system. This security module is adapted to make the forwarding of data from and to this interface dependent on the result of a check of:
  the sender of the data, and/or
  the recipient of the data, and/or
  the form and/or content of the data.

In this way, the security development of the computer system and/or control system can be particularly well decoupled from the application development.

As explained previously, most attacks are conducted with specially crafted invalid input via interfaces that the attacker uses to impose his will on the software once the software processes this input. If the software is to be hardened against attacks of this type, a lot of additional code is required to check whether the inputs meet the specifications. For example, if the data format used includes an indication of the size of image data to be transmitted in bytes followed by the image data itself, it is necessary to check whether the size indication is really followed by only the advertised amount of bytes or whether more bytes follow with the aim of provoking a buffer overflow. If input is processed in text form, it must be checked whether it contains special characters that can be used to steer further processing in a completely different direction than originally intended (as in SQL injection). The software is therefore a mixture of code that contains the actual functionality of the computer system and/or control system and code for checking the input for possible attacks. This complicates the development of the software and increases the risk that the version of the software that is ultimately delivered will have security vulnerabilities after all. For example, if a routine that is properly secured against invalid input is removed from the software in order to replace it with a new version, it is easy to forget to implement all the previously existing checks for invalid input in the new version as well.

The security module allows a large portion of such checks to be performed upstream, before the actual computer system and/or control system software sees the inputs. The development of this software can then be essentially focused on ensuring that the computer system and/or control system does what it is supposed to do given valid inputs. The question of whether the software can be maliciously persuaded to do something it is not supposed to do is no longer pressing.

At the same time, the monitoring module makes it possible not only to monitor the functionality of the software, but also to import updates for it in a secure manner.

In a particularly advantageous embodiment, the security module is configured to make the forwarding of data dependent on the condition that, in view of a predetermined set of rules,
   a relationship between the sender of the data and the receiver of the data is plausible, and/or
   the data are likely to be processable by their recipient.

For example, cameras and other sensors are sources of physical measurement data, while a computer system provided for evaluating such data is a sink for such physical measurement data. It is then plausible that the sensors provide large amounts of measurement data to the computer system for analysis. In contrast, it is not plausible that large amounts of data should flow in the reverse direction from the computer system for analysis to the sensors or from one sensor to another. Instead, for example, traffic from one sensor to another may be due to an attempt to spread a malicious code worm-like to other sensors starting from the one sensor. Traffic between the Internet and a sensor may indicate that an attacker has taken control of the sensor and that the sensor is no longer doing its original job, but is doing something completely different.

Checking whether the data is likely to be processable by the receiver may be done, for example, by reference to a data format expected by the receiver, and/or by reference to a range of values of the data expected by the receiver. In this way, for example, an attempt to steer the control flow of the receiver's software in a direction never intended by its developer can be detected by a deliberate violation of the specifications of a file format or other specification (such as the aforementioned announcement of an initial number of bytes and delivery of a larger quantity of bytes, clock times with hour numbers beyond 24 and minute numbers beyond 60, negative values for a light intensity).

In another particularly advantageous embodiment, the security module is configured to make the forwarding of data dependent on the sender having encrypted and/or signed the data with a predetermined key. In this way, for example, attempts to impersonate the sender in a network over which the sender and the recipient of the data communicate with each other can be prevented. If the data has not been encrypted or has not been encrypted with the correct key, decryption will fail and the security module will not be able to analyse the data further at all.

Intercepting unauthorized data at this stage is significantly easier and therefore more secure than checking conformance to a data format. Format checking is a comparatively broad, error-prone interface, which itself must be implemented with great care so that it cannot in turn be subverted by deliberately invalidly formatted data.

In particular, the security module may be configured to decrypt incoming encrypted data for forwarding to the computer system and/or control system interface, and to encrypt unencrypted data incoming from that interface.

In a further advantageous embodiment, the security module is adapted to determine a key for encryption, and/or for decryption, using at least one key and/or hash value obtained from the monitoring module. For example, a key currently valid for encrypting a request for system state may also be valid for sending data intended for the computer system and/or control system interface. Then, as with the system state requests, a constant change of keys is provided, which prevents reuse of old data (replay).

In a further particularly advantageous embodiment, the security module is additionally configured to determine at least one input data hash value using valid input data which it has received for forwarding to the interface of the computer system and/or control system, and to use this input data hash value to form at least one key. Then, for example, the input data itself can be used to change keys for communication with interfaces of the computer system and/or control system mediated via the security module, and/or keys for communication with the monitoring module. In this way, new keys can be obtained more quickly than by using a pseudo-random number generator. Unless the input data is predictable, it is a shared secret between its sender and the security module.

In another particularly advantageous embodiment, the response generated by the monitoring module also includes the input data hash value. In this way, it is possible to additionally check whether input data arrive properly at the security module and are recognized as valid by the security module. This makes it possible to detect attempts to influence the function of the computer system and/or control system by falsifying or suppressing valid input data, for example during transmission via a network.

When updating the input data hash value, the security module can also be configured to use the previous input data hash value in addition to the current input data to determine the new input data hash value. With regard to the cryptographic security of keys generated from input data, this compensates for the fact that the input data is only partially random. For example, image data provided by a camera can be predicted within certain limits based on own observations of the same scenery. By now also using the previous input data hash value, the complete history of the input data is relevant for the generated keys.

In another particularly advantageous embodiment, the monitoring module or the security module is configured to accept requests, commands or data authenticated with previously valid keys in response to the fact that it has not received any requests, commands or data authenticated with a currently valid key for a predetermined period of time. The described change of keys requires that the monitoring module, or the security module, and the respective communication partner constantly keep each other up to date with the next valid key. There may be situations in which such information does not reach the recipient. For example, the information may be lost during transmission over a network, or the communication partner may lose the key, for example if the battery is completely discharged. In this case, by reverting to previously valid keys, communication can be re-established without manual intervention.

The invention also relates to a data processing module, data storage module, camera module, sensor module and/or actuator module. This module comprises the previously described system, and/or it comprises an FPGA device which is circuitry integrated into the module in such a way that it can be made into the previously described system, and/or into a monitoring module and/or security module of this system, by programming. As previously explained, the security development of the data processing module, data storage module, camera module, sensor module and/or actuator module can then be decoupled from the respective application development. Accordingly, development cycles are shortened. In particular, once the safety functions have been implemented in the form of a monitoring module or safety module, they can be reused for different applications with no or only minor specific adaptations.

The functionality of the monitoring module, and/or the security module, may be implemented in whole or in part in software. Therefore, the invention also relates to a computer program with machine-readable instructions which, when executed on a hardware platform and/or introduced as a configuration into this hardware platform, make the hardware platform into the previously described system, and/or into a monitoring module and/or security module of this system.

Similarly, the invention also relates to a machine-readable storage medium, and/or a download product, comprising the computer program.

SPECIAL DESCRIPTION PART

Figure 2:
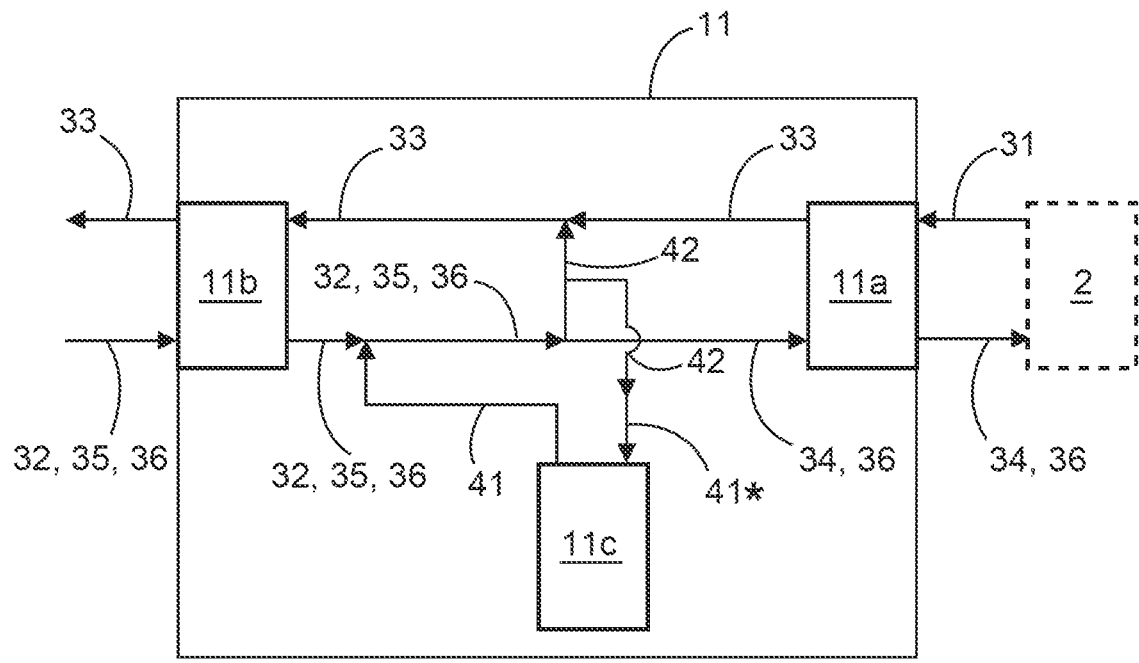
Figure 3:
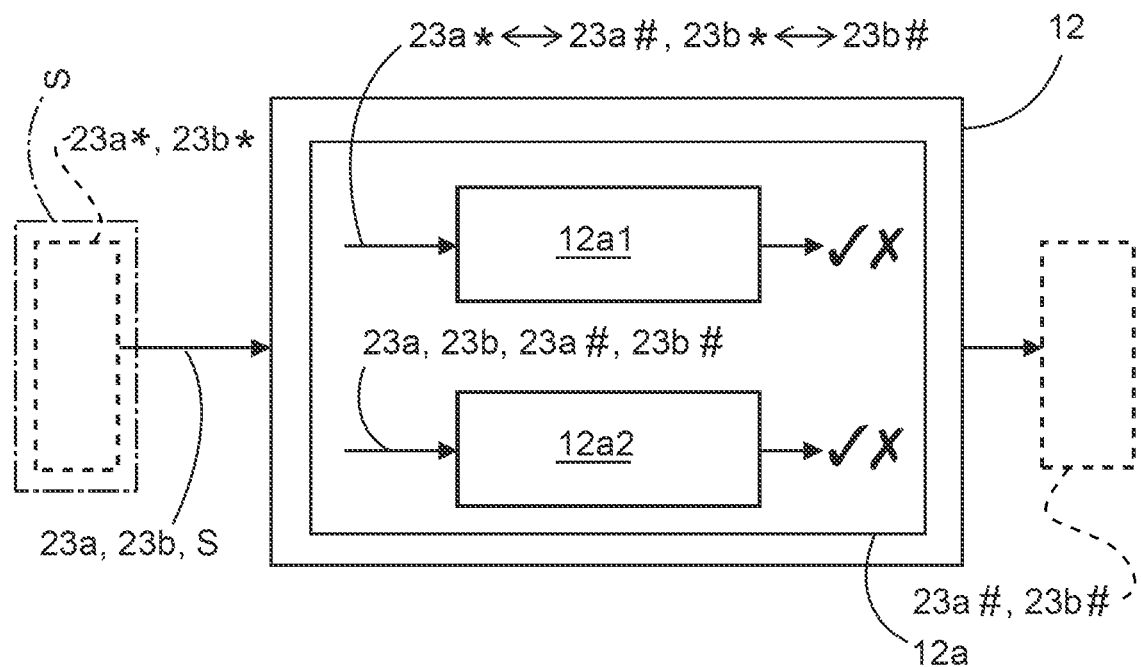

Hereinafter, the subject matter of the invention will be explained with reference to figures without limiting the subject matter of the invention herein. It is shown:

FIG. 1: Interaction of system 1 with an exemplary computer system and/or control system 2;

FIG. 2: Exemplary sequence within the monitoring module 11 of system 1;

FIG. 3: Exemplary sequence within the safety module 12 of system 1.

FIG. 1 shows an example of the interaction of an embodiment of system 1 with an exemplary computer system and/or control system 2. The computer system and/or control system 2, which is shown in a highly simplified form, comprises a memory 21, a CPU 22 and an interface 23 for communication with the outside world. The memory 21, the CPU 22 and the interface 23 are interconnected via a bus system 24.

In the example shown in FIG. 1, the system 1 for protecting the computer system and/or control system 2 comprises a monitoring module 11 and a security module 12. The monitoring module 11 reads out information 31 about the system status of the computer system and/or control system 2. In FIG. 1, a tap from the bus system 24 and a tap from the memory 21 are shown as exemplary data sources. However, any other data sources can be used alternatively or in combination, such as sensors of any type. For example, the system load can be determined via the temperature or the fan speed of the CPU 22.

In response to a request 32, the monitoring module 11 determines a response 33 from the information 31, thereby responding to the request 32. This response 33 may be used by an external entity not shown in FIG. 1, such as an operator, to determine whether action is required with respect to the computer system and/or control system 2. If action is required, this external entity may send a command 35 to the monitoring module 11 causing the monitoring module 11 to apply a countermeasure 34 to the computer system and/or control system 2. An exemplary sequence within the monitoring module 11 is explained in more detail in FIG. 2.

In the same way, an update or patch 36 may be supplied for uploading to the computer system and/or control system 2.

The security module 12 verifies incoming data 23a destined for the interface 23, as well as data 23b outgoing from the interface 23, before forwarding it to the interface 23, or to the outside world. In addition to the data 23a, 23b itself, the sender 23a*, 23b*, and/or the receiver 23a #, 23b #, of the data 23a, 23b may be checked. An exemplary sequence within the security module 12 is explained in more detail in FIG. 3.

FIG. 2 illustrates an exemplary sequence within an embodiment of the monitoring module 11. The monitoring module 11 has a first interface 11a connectable to the computer system and/or control system 2, a second interface 11b for communication with the outside world, and a memory 11c.

The monitoring module 11 receives a request for the system state of the computer system and/or control system 2 via the second interface 11b. This request is decrypted using a request key 41 obtained from the memory 11c. In the process, a response key 42 is revealed in addition to the actual request 32. The monitoring module 11 retrieves information 31 on the system state from the computer system and/or control system 2 via its first interface 11a and generates therefrom a response 33 to the request 32, which is output encrypted with the response key 42 via the second interface 11b. From the request 32, in this case from the response key 42, a new request key 41* is further determined and stored in the memory 11c. In this way, a constant change of the keys used is ensured, and a reuse of old messages (replay) is prevented.

As already explained in connection with FIG. 1, a command 35 received via the second interface 11b may be used to exercise a countermeasure 34 against an abnormal condition, and/or abnormal activity, of the computer system and/or control system 2. Similarly, an update or patch 36 may be applied to the computer system and/or control system 2 in this manner.

FIG. 3 shows an exemplary sequence within an embodiment of the security module 12. Whether data 23a, 23b are forwarded from their respective sender 23a*, 23b* to their respective recipient 23a #, 23b # depends on rules 12a. Before these rules are checked, the respective sender 23a*, 23b* can be authenticated in particular, for example, on the basis of a signature S of the data 23a, 23b. In this way, attempts to create the false appearance that data conforms to rules 12a by pretending to be from a false sender (spoofing) can be prevented.

A first portion 12a1 of these rules 12a conditions the forwarding of the data 23a, 23b on relationships between the respective senders 23a*, 23b* and receivers 23a #, 23b # of the data 23a, 23b. In this way, for example, worm-like propagation of a malicious code in a network of IoT devices that are supposed to communicate only with a central server and not directly with each other can be prevented.

A second portion 12a2 of the rules 12a conditions the forwarding of the data 23a, 23b on the data 23a, 23b being expected to be processable by its respective recipient 23a #, 23b #. This can be used, for example, to prevent attacks with invalid data 23a, 23b that are intended to steer the control flow of the software of the respective receiver 23a #, 23b # in an unforeseen new direction.

LIST OF REFERENCE SIGNS

1 System for protection
11 Monitoring module of system 1

11a, 11b Interfaces of the monitoring module 11
11c Memory of the monitoring module 11
12 Safety module of system 1
12a Rules for data traffic in security module 12
12a1 Rules on sender-recipient relationships for data 23a, 23b
12a2 Rules on processability of data 23a, 23b
2 Computer system and/or control system
21 Memory of the computer system and/or control system 2
22 Processor (CPU) of the computer system and/or control system 2
23 Interface of the computer system and/or control system 2
23a Incoming data destined for interface 23
23a* Sender of the data 23a
23a # Receiver of the data 23a
23b Data outgoing from interface 23
23b* Sender of the data 23b
23b # Receiver of the data 23b
24 Bus system of the computer system and/or control system 2
31 State of the computer system and/or control system 2
32 Request for state 31
33 Response to request 32
34 Countermeasure against abnormal condition/abnormal activity
35 Command for countermeasure 34
36 Update or patch for computer system and/or control system 2
41 Request key
41* New request key
42 Answer key
S Signature

The invention claimed is:

1. A system for protecting at least one of a computer system or control system against manipulation and functional anomalies, wherein the system comprises a monitoring module which has at least a first interface, a second interface, and at least one memory and is configured to:
receive information characterizing a system state of the computer system and/or control system via the first interface;
receive an encrypted request for the system state via the second interface and decrypt an encrypted response using a request key stored in the memory;
generate a response to the request from at least a portion of the information received via the first interface;
encrypt the response with a response key determined using the request and output the encrypted response via the second interface;
determine a new request key which is a shared secret also accessible to a sender of the request; and
store the new request key in the memory.

2. The system according to claim 1, wherein the monitoring module is additionally adapted to encrypt the new request key with the response key and to output the new request key together with the response via the second interface.

3. The system according to claim 1, wherein the monitoring module is additionally adapted to determine the new request key using the request.

4. The system according to claim 1, wherein the monitoring module is additionally adapted to form a new request key using the response key and to store the new request key in the memory.

5. The system according to claim 1, wherein the monitoring module is additional configured to:
compare a compressed digest of a key contained in the request with a comparison digest stored in the memory, and in response to the compressed digest matching the comparison digest;
store a new compressed digest contained in the request as a new comparison digest in the memory; and
to use the key contained in the request to form the answer key.

6. The system according to claim 5, wherein the monitoring module is additionally adapted to determine a new request key using the new compressed digest and to store the new request key in the memory.

7. The system according to claim 1, wherein the information characterizing the state of the at least one of the computer system or control system comprises one or more of:
program code executable by at least one processor of the at least one of the computer system or control system;
fixed parameters and/or parameters which can only be changed externally and which influence the operation of the at least one of the computer system or control system;
configuration data for at least one field programmable gate array, FPGAs, or at least one other programmable logic device of the at least one of the computer system or control system; or
size or content of nominally unused memory areas of the at least one of the control system or computer system.

8. The system according to claim 1, wherein the monitoring module is additionally configured to determine, according to a predetermined metric, a measure of a change in information used to form the response within a predetermined time period.

9. The system according to claim 8, wherein the monitoring module is additionally adapted to initiate at least one countermeasure against an attack on the at least one of the computer system or control system, or against a malfunction of the at least one of the computer system or control system, in response to the detected change satisfying a predetermined criterion.

10. The system according to claim 1, wherein the monitoring module is additionally adapted to initiate at least one countermeasure against an attack on the at least one of the computer system or control system, or against a malfunction of the at least one of the computer system or control system, in response to having received via the second interface a control command encrypted with the request key stored in the memory.

11. The system according to claim 9, wherein the countermeasure includes one or more of:
an alarm is issued;
the at least one of the computer system or control systems switched off, restarted or reset to factory settings;
a software update and/or patch is applied to the at least one of the computer system or control system;
the value of the at least one of the computer system or control system in a decentralized peer-to-peer network is reduced;
the at least one of the computer system or control system is caused to output operating data, log data or diagnostic information;
the at least one of the computer system or control system is caused to protect important data from being lost by sending the important data via a communication interface;

the at least one of the computer system or control system is caused to protect confidential data from disclosure by deletion;

the at least one of the computer system or control system is put into emergency operation;

a logistic action is initiated; or a self-test of the at least one of the computer system or control system is initiated.

12. The system according to claim 1, wherein the monitoring module is additionally adapted, in response to having received via the second interface an update encrypted with the request key stored in the memory, to cause the update to be applied to the at least one of the computer system or control system.

13. The system according to claim 1, wherein the response generated by the monitoring module includes at least one of:

a hash value of information used to form the response, or a measure, determined according to a predetermined metric, of a change in that information within a predetermined time period.

14. The system according to claim 1, further comprising at least one security module via which the communication from and to at least one interface of the at least one of the computer system or control system is routed, wherein the security module is configured to make the forwarding of data from and to the at least one interface dependent on the result of a check of at least one of:

the sender of the data;

the recipient of the data; or the form and/or content of the data.

15. The system according to claim 14, wherein the security module is adapted to make the forwarding of data dependent on the condition that, in view of a predetermined set of rules, a relationship between the sender of the data and the recipient of the data is plausible, or the data are likely to be processable by their recipient.

16. The system according to claim 15, wherein at least one rule relates to at least one of a data format expected by the receiver, or to a range of values of the data expected by the receiver.

17. The system according to claim 14, wherein the security module is adapted to make the forwarding of data dependent on the sender having encrypted or signed the data with a predetermined key.

18. The system according to claim 17, wherein the security module is adapted to decrypt incoming encrypted data for forwarding to the interface of the computer system and/or control system, and to encrypt incoming unencrypted data from this interface.

19. The system according to claim 17, wherein the security module is adapted to determine a key for encryption, or for decryption, using at least one key and/or hash value obtained from the monitoring module.

20. The system according to claim 17, wherein the security module is additionally configured to determine at least one input data hash value using valid input data that the security module has received for forwarding to the interface of the at least one of the computer system or control system and to use this input data hash value to form at least one key.

21. The system according to claim 20, wherein the response generated by the monitoring module also includes the input data hash value.

22. The system according to claim 20, wherein the security module is further configured to use, in addition to current input data, the previous input data hash value for determining the new input data hash value when updating the input data hash value.

23. The system according to claim 1, wherein the monitoring module, respectively the security module, is adapted, in response to not having received requests, commands or data authenticated with a currently valid key for a predetermined period of time, also accept requests, commands or data authenticated with previously valid keys.

24. The system of claim 1 further comprising at least one of a data processing module, data storage module, camera module, sensor module, or actuator module and having an FPGA module which is integrated in the data processing module, data storage module, camera module, sensor module or actuator module in terms of circuitry in such a way that the FPGA module forms a portion of a monitoring module or security module.

25. A non-transitory, computer readable storage medium having a program stored thereon comprising machine-readable instructions which, when executed on a hardware platform or introduced as a configuration into said hardware platform, make said hardware platform protect at least one of a computer system or control system against manipulation and functional anomalies, wherein the system comprises a monitoring module which has at least a first interface, a second interface, and at least one memory and is configured to:

receive information characterizing a system state of the computer system and/or control system via the first interface;

receive an encrypted request for the system state via the second interface and decrypt an encrypted response using a request key stored in the memory;

generate a response to the request from at least a portion of the information received via the first interface;

encrypt the response with a response key determined using the request and output the encrypted response via the second interface;

determine a new request key which is a shared secret also accessible to a sender of the request; and store the new request key in the memory.

* * * * *